US005569015A

United States Patent [19]

Gerlier

[11] Patent Number: 5,569,015

[45] Date of Patent: Oct. 29, 1996

[54] INTERMEDIATE STORAGE APPARATUS

[75] Inventor: André Gerlier, Sciez, France

[73] Assignee: Mars Incorporated, McLean, Va.

[21] Appl. No.: 235,190

[22] Filed: Apr. 29, 1994

Related U.S. Application Data

[63] Continuation of Ser. No. 732,034, Jul. 18, 1991, abandoned.

[30] Foreign Application Priority Data

May 8, 1991 [CH] Switzerland ............................ 1392/91

[51] Int. Cl.[6] .................................................. B65G 57/00

[52] U.S. Cl. .................................... 414/790.7; 414/794.8; 271/200; 271/212

[58] Field of Search .................................... 197/206, 207; 271/212, 200, 303, 298, 163, 65; 414/790.7, 794.4

[56] References Cited

U.S. PATENT DOCUMENTS

| | | | |
|---|---|---|---|
| 3,409,149 | 11/1968 | Graux . | |
| 3,712,611 | 1/1973 | Jacquot et al. . | |
| 3,761,076 | 9/1973 | Gianese . | |
| 3,765,523 | 10/1973 | Nakanishi | 194/207 |
| 3,768,807 | 10/1973 | Spengler . | |
| 3,877,628 | 4/1975 | Asselin et al. . | |
| 3,926,427 | 12/1975 | Moksnes et al. . | |
| 4,132,398 | 1/1979 | Erdmann et al. . | |
| 4,280,691 | 7/1981 | Blum . | |
| 4,804,175 | 2/1989 | Grandjean . | |
| 4,807,866 | 2/1989 | Stemmle | 271/212 |
| 4,830,351 | 5/1989 | Stanislaw . | |
| 4,830,742 | 5/1989 | Takesako . | |
| 4,958,824 | 9/1990 | Willits et al. . | |
| 4,974,825 | 12/1990 | Bizic et al. . | |
| 5,046,709 | 9/1991 | Beal . | |
| 5,067,701 | 11/1991 | Dekker | 271/303 |
| 5,076,413 | 12/1991 | Davila et al. . | |
| 5,116,037 | 5/1992 | Gerlier et al. . | |
| 5,353,477 | 10/1994 | Hille . | |

FOREIGN PATENT DOCUMENTS

| | | | |
|---|---|---|---|
| 0072237 | 2/1983 | European Pat. Off. . | |
| 2593485 | 7/1987 | France . | |
| 335711 | 8/1919 | Germany . | |
| 622076 | 10/1935 | Germany . | |
| 9005298 | 10/1990 | Germany . | |
| 62-295876 | 12/1987 | Japan | 271/303 |
| 288604 | 1/1953 | Switzerland . | |
| 897056 | 5/1962 | United Kingdom . | |
| 1510934 | 5/1978 | United Kingdom . | |
| 1542355 | 3/1979 | United Kingdom . | |
| 2023106 | 12/1979 | United Kingdom | 271/303 |
| 2130414 | 5/1984 | United Kingdom . | |
| 2161145 | 1/1986 | United Kingdom . | |
| 2168689 | 6/1986 | United Kingdom . | |
| 2198122 | 6/1988 | United Kingdom . | |

OTHER PUBLICATIONS

"Bill Arrangement Mechanism for Bill–Handling Machine," K. Satoh, IBM Tech. Disclosure Bulletin, vol. 26, No. 9, Feb. 1984, pp. 4580–4581.

*Primary Examiner*—Karen Merritt
*Assistant Examiner*—Gregory A. Morse
*Attorney, Agent, or Firm*—Fish & Richardson P.C.

[57] ABSTRACT

An intermediate storage apparatus for the storage of sheets has an acceptance cycle and a transportation cycle and includes a feed system and a transportation system. In the acceptance cycle the intermediate storage apparatus waits until a first detector detects the presence of a sheet at an entry and triggers off an acceptance operation in the feed system by way of a control device. The feed system stacks the sheets which are fed by a conveyor system to provide a stack in the transportation system which is locked in the acceptance cycle. As soon as the acceptance cycle is concluded, the control device decides whether the transportation system is to pass the stack into a box or into a return dish and switches on a drive unit of the transportation system to transport the stack. The intermediate storage apparatus then returns to the acceptance cycle.

51 Claims, 1 Drawing Sheet

INTERMEDIATE STORAGE APPARATUS

This is a continuation of application Ser. No. 07/732,034 filed on Jul. 18, 1991, now abandoned.

BACKGROUND OF THE INVENTION

1. Field of the Invention

The invention relates to an intermediate sheet storage apparatus which is suitable for example for automatic service machines in which a plurality of banknotes are received as payment for the furnishing of a service and may only be accepted after the service has been furnished or, if that is not possible, returned to a user.

2. Description of the Prior Art

German patent specification No. 2 619 620 describes an intermediate storage apparatus for the short-term storage of sheets of paper. The sheets of paper which have already been put into intermediate storage are held fast in a bundle between transportation belts and are pushed to and fro as a pack, for the purposes of deposit of a further sheet thereon. Such operation subjects the sheets to a mechanical loading.

In an apparatus in accordance with European patent application EP 251 833, a single sheet may be put into intermediate storage in a pocket, while a further sheet may already be accommodated in the pocket before the first sheet is entirely removed from the pocket.

Swiss patent application No. 02 566/90-1, filed on Aug. 6, 1990, and its corresponding U.S. patent application entitled "Apparatus for Stacking Sheets" by André Gerlier, which is being filed on even date herewith and is now U.S. Pat. No. 5,139,149 (both of which are incorporated herein as if printed in full below), describe an apparatus for stacking sheets in which a carriage which is displaceable over at least one stack alters the geometry of transportation belts by means of guide rollers in order to deposit the sheet on the stack without the transportation belts or the sheet to be deposited sliding on the previous top sheet of the stack.

OBJECT AND SUMMARY OF THE INVENTION

An object of the present invention is to provide a simple and inexpensive intermediate storage apparatus for a plurality of sheets, wherein the sheets are exposed to little or insignificant mechanical loading.

In accordance with the present invention, there is provided an intermediate sheet storage apparatus, comprising: a first conveyor belt; a second endless conveyor belt; an inlet station; first mounting means for mounting said first and second conveyor belts so as to define therebetween a feed path from said inlet station; a third endless conveyor belt; first and second outlet stations; second mounting means for mounting said second and third conveyor belts so as to define therebetween first and second transportation paths to said first and second outlet stations, respectively; drive means for driving said conveyor belts; and control means for controlling said drive means selectably (a) in an acceptance mode in which said third belt is stationary and in which said first and second belts are moved together along said feed path so as to feed sheets from said inlet station along said feed path to form a stationary stack on said third belt between said second and third belts, and (b) in a transportation mode in which said second and third belts are moved together along said transportation paths so as to transport said stack along one of said transportation paths to one of said outlet stations.

Other objects, features and advantages of the present invention will become apparent upon consideration of the following detailed description of a preferred embodiment thereof, especially when considered with the accompanying drawings in which like reference numerals are employed to designate the same or similar components in the different figures.

DETAILED DESCRIPTION OF THE PREFERRED EMBODIMENT

Figure 1:
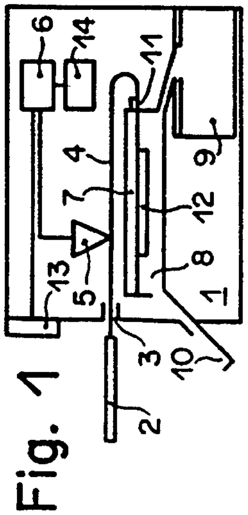
FIG. 1 shows an automatic service machine.

In FIG. 1, reference numeral 1 identifies an automatic service machine (referred to for the sake of brevity as the automatic machine 1) while reference numeral 2 identifies a sheet which is pushed through a receiving slot 3 in the automatic machine 1 into a conveyor system 4. The automatic machine 1 further includes a sensor 5 and a control device 6 which is connected thereto, a feed system 7, and a transportation system 8 with two outputs, one of which communicates with a box 9 while the other output communicates with a return dish 10. The feed system 7 and the transportation system 8 form the intermediate storage apparatus. The conveyor system 4 is designed to transport the sheets 2 from the receiving slot 3 of the automatic machine past the sensor 5 to an entry 11 of the feed system 7.

The control device 6 produces commands for the intermediate storage apparatus, with the commands being associated with an acceptance cycle or a transportation cycle. The acceptance cycle comprises two rest conditions and acceptance operations or idle travels. The intermediate storage apparatus goes from one rest condition into the other by means of the acceptance operation or the idle travel. During the acceptance cycle the intermediate storage apparatus waits in the rest condition until the sheet 2 which is supplied to it by means of the conveyor system 4 during the acceptance operation reaches the entry 11. As soon as the acceptance cycle is concluded, the control device 6 changes into the transportation cycle, in which case the sheets 2 which are collected in the intermediate storage apparatus during the acceptance cycle are transported through one of the two outputs into the box 9 or into the return dish 10 respectively.

The box 9 may also be replaced by other devices (not shown here) which are suitable for processing of the sheets 2 collected in the intermediate storage apparatus.

The sensor 5 is designed to sense features of the sheet 2 which is transported therepast. For example it may recognise authenticity features by an optical procedure or it may detect magnetic areas of an image which is printed with magnetic ink. Sensor signals generated by the sensor 5 are processed in the control device 6.

Sheets 2 can be successively fed to the conveyor system 4 through the receiving slot 3 until the acceptance cycle is concluded. The conveyor system 4 transports the sheet 2 through the entry 11 into the feed system 7 which deposits sheets sheet-by-sheet on a stack 12 which is being formed, in the transportation system 8, the stack 12 not being moved when the freshly supplied sheet 2 is deposited thereon.

If for example the sheets 2 are banknotes, the automatic machine 1 may request a predetermined amount for a service and receives banknotes until the control device 6 has established by means of the sensor 5 that the predetermined amount has been reached. The user may also transmit to the automatic machine 1 the amount to be introduced or indicate the end of the acceptance cycle, by way of a keyboard 13 which is disposed at the front side of the automatic machine 1 and which is connected to the control device 6.

The control device 6 is connected to a storage device 14 which provides for intermediate storage, for each sheet 2 in the stack 12, of the test results such as for example value, authenticity etc. When the acceptance operation is concluded, the control device 6 checks the content of the storage device 14, to ascertain whether all sheets 2 in the stack 12 comply with the predetermined requirements. If that is the case, the control device 6 decides to collect the stack 12, in which case the transportation device 8 conveys the stack 12 into the box 9, while if that is not the case, the stack 12 is rejected and passed to the return dish 10. The control device 6 can also immediately break off the acceptance cycle and cause the stack 12 to be conveyed into the return dish 10 if the control device 6 has classified the sheet 2 as being one which does not comply with the requirements, or if the user terminates the acceptance cycle by way of the keyboard 13.

Figure 2:
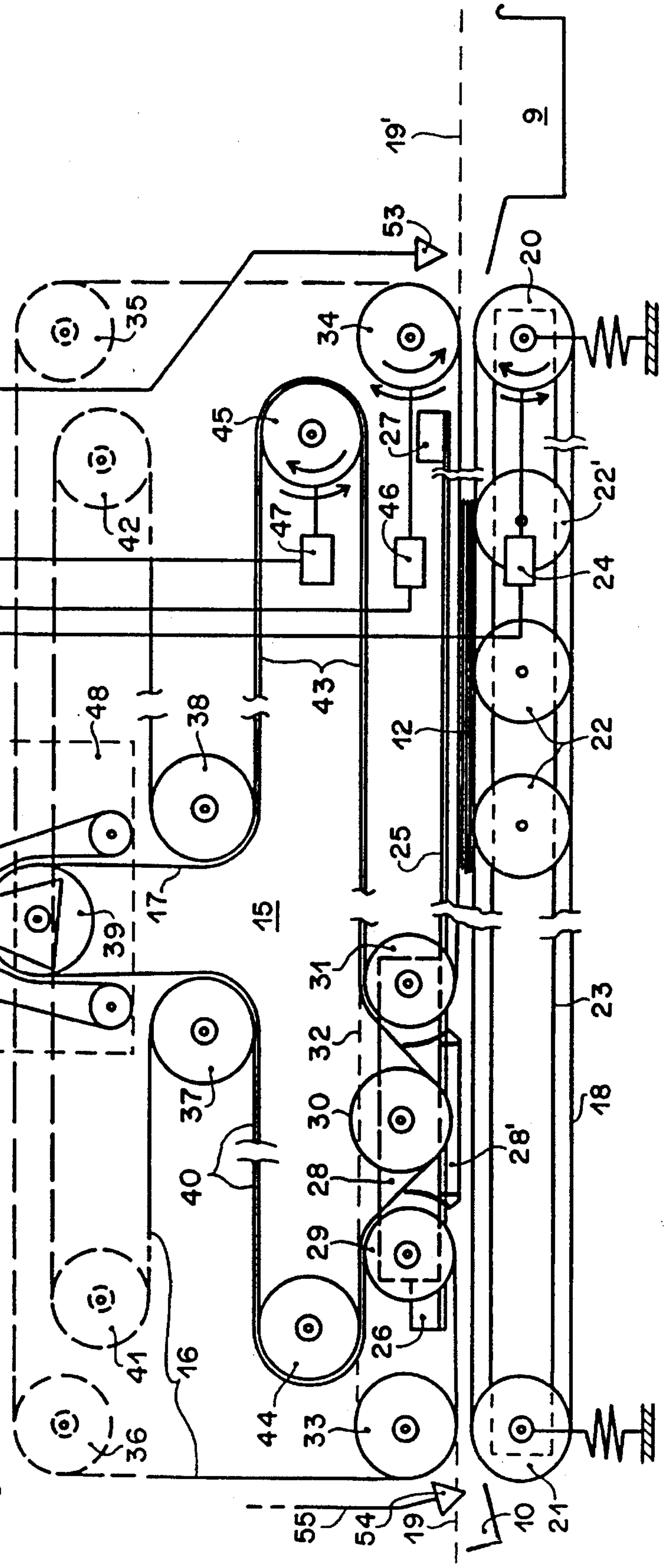
FIG. 2 shows an intermediate storage arrangement.

FIG. 2 shows by way of example an intermediate storage apparatus. One of the parallel sectional planes 15 through the intermediate storage apparatus which is in the rest condition has been selected as the plane of the drawing. The feed system 7 (FIG. 1) is formed by an endless belt 16 and a feed belt 17 while the transportation system 8 (FIG. 1) includes the endless belt 16 and an endless transportation belt 18. As shown in broken lines, guides and sections of the endless belt 16 lie outside the sectional plane 15 in order not to hinder sheet transportation. The endless belt 16 and the feed belt 17 are disposed above a stack plane 19, 19' which is normal to the sectional plane 15, while the transportation belt 18 is disposed beneath the stack plane 19, 19'.

At least in the plane 19, 19', parts of the two belts 16 and 18 are guided in parallel relationship and enclose the plane 19, 19'. The stack 12 is clamped between stacking sections of the endless belt 16 which define the stack plane 19, 19', and a closer section, which is parallel thereto, of the transportation belt 18, wherein the stack 12 urges the section of the transportation belt 18 away from the stack plane 19, 19'. The sheet 2 which is deposited on the stack 12 at the beginning of the acceptance operation lies directly on the transportation belt 18.

The endless transportation belt 18 is tensioned by a drive roller 20 and a guide roller 21 so that the one section of the transportation belt 18 and the stacking section of the endless belt 16 form a transportation path for the stack 12, which is parallel to the stack plane 19, 19' and which is delimited by the two rollers 20 and 21. The transportation path for the stack 12 leads into the box 9 on one side and into the return dish 10 on the other side.

It is advantageous for further support rollers 22 and 22' to be arranged at least in the region of the stack 12, to support the stack 12 and the transportation belt 18 on the parallel section and to stabilise the stack 12. The shafts of the rollers 20 through 22 are arranged in mutually parallel relationship and in a frame 23.

The frame 23 is displaceable normal to the stack plane 19, 19', by overcoming a counteracting force which is produced for example by springs, so that advantageously a large number of sheets 2 can be deposited on the stack 12 and the intermediate storage apparatus has a large storage capacity which depends only on the configuration of the frame 23 or the spring travel thereof. The counteracting force compresses the stack 12 and ensures that it is securely held in place in the transportation path for the stack 12 between the endless belt 16 and the transportation belt 18.

The drive roller 20 has a roller motor 24 which is connected to the control device 6 by way of a line and which is powered by the control device. The roller motor 24 can be arranged on the frame 23. The control device 6 may drive the roller motor 24 or the transportation belt 18 in a predetermined direction of travel. The roller motor 24 locks the transportation belt 18 during the acceptance cycle.

Arranged parallel to the stack plane 19, 19' and to the sectional plane 15 on the side of the endless belt 16 is a rail 25 for a carriage 28 which is displaceable on the rail 25 between two limit positions 26 and 27. The limit positions 26 and 27 lie outside the region of the stack 12, with the first limit position 26 being closer to the return dish 10. The carriage 28 carries three guide rollers 29 through 31 in juxtaposed relationship in the sectional plane 15. The two outer guide rollers 29 and 31 touch with their periphery on the one hand the stack plane 19, 19' and on the other hand a feed plane 32 which is parallel thereto, both the planes 19, 19' and 32 intersecting the sectional plane 15. The first outer guide roller 29 is closer to the return dish 10 than the second guide roller 31.

From the point of view of the return dish 10, the endless belt 16 extends in the stack plane 19, 19' between a roller 33 and the first outer guide roller 29, and between the second guide roller 31 and a drive roller 34, thereby forming the two stacking sections of the endless belt 16. The roller 33 and the drive roller 34 are so spaced that the rail 25 with the two limit positions 26, 27 extends therebetween. Above the stack plane 19, 19', the endless belt 16 is guided by means of direction-changing rollers 35, 36 outside the sectional plane 15 from the drive roller 34 to the roller 33.

By way of example, disposed over the stack 12 and above the feed plane 32 at the same spacing are a first entry roller 37 and a second entry roller 38, wherein the first entry roller 37 is closer to the return dish 10 in the sectional plane 15. Somewhat further away from the feed plane 32, a switching roller 39 is mounted between the two entry rollers 37 and 38.

The first outer guide roller 29 lifts the endless belt 16 away from the stack plane 19, 19' and deflects it in the sectional plane 15 around 180° into the feed plane 32. From the first outer guide roller 29 to the first entry roller 37, the endless belt 16 contacts the feed belt 17 and thus over that section forms a first conveyor path 40 for the sheet 2. The first entry roller 37 separates the two belts 16 and 17. The endless belt 16 is guided to the second entry roller 38 by means of further direction-changing rollers 41, 42 outside the sectional planes 15. At the switching roller 39 the feed belt 17 is deflected through 180° around same relative to the feed plane 32 and again bears against the endless belt 16 at the second entry roller 38. The two belts 16, 17 are then jointly guided to the second outer guide roller 31 and form a second conveyor path 43 for the sheet 2. In the sectional planes 15 the second outer guide roller 31 deflects the endless belt 16 out of the feed plane 32 through 180° into the stack plane 19, 19'. The length of the two conveyor paths 40 and 43 depends on the position of the carriage 28 on the rail 25.

Between the two outer guide rollers 29 and 31, the central guide roller 30 presses the feed belt 17 down on to the stack plane 19, 19', except for a predetermined small spacing, while the feed belt 17 lies against the endless belt 16 which is passed around the outer guide rollers 29 and 31. A deflector plate 28' which is secured to the carriage 28 beneath the central guide roller 30 prevents the feed belt 17 coming into contact with the stack 12.

In order to save space, the two conveyor paths 40 and 43 may be guided with an alternating direction of transportation movement in the sectional plane 15 by means of at least one deflector roller 44 and by means of at least one deflector roller 45, over which the belts 16 and 17 jointly pass from the feed plane 32 to the entry rollers 37 and 38.

The rollers are cylinders which are freely rotatable about their axes and which are suited to the belts 16 through 18. The axes of the rollers 20 through 22, the guide rollers 29 through 31, the entry rollers 37 and 38, the switching roller 39 and the deflector rollers 44 and 45 are arranged normal to the sectional planes 15. The shafts of the guide rollers 29 through 31, which are carried by the carriage 28, are displaceable in parallel relationship to the above-mentioned, fixedly disposed axes. The axes of the roller 33, the drive roller 34 and the direction-changing rollers 35, 36, 41 and 42 may be inclined relative to the sectional plane 15, as is governed by the way in which the endless belt 16 is guided outside the sectional planes 15.

The drive roller 34 has a drive 46 which is connected to the control device 7 by way of a line and which is powered by the control device. The control device 6 may drive the drive 46 or the endless belt 16 in a predetermined direction of travel. During the acceptance cycle the drive roller 34 is locked by means of the drive 46 and the endless belt 16 is held fast at the location of the drive roller 34.

Instead of the roller motor 24, the drive 46, besides the drive roller 34, may simultaneously also drive the drive roller 20, in which case the drive roller 34 and the drive roller 20 are of the same periphery and rotate in opposite relationship. In another example without a roller motor 24, the endless belt 16 may transmit its movement directly or by way of the stack 12 to the transportation belt 18. All the constructions have the feature in common that the transportation system 7 is locked in the acceptance cycle.

The drive for the feed belt 17 is by means of a conveyor motor 47 which acts on one of the rollers 37, 38, 42, 44 or 45, for example the deflector roller 45 which is connected to the control device 6 by way of a line and which is powered by the control device. During the acceptance cycle the control device 6 can drive the conveyor motor 47 or the feed belt 17 in a predetermined direction of movement, in which case the carriage 28 is moved on the rail 25 as the endless belt 16 is held fast at the drive roller 34. If the deflector roller 45 rotates in the clockwise direction, the carriage 28 travels to the first limit position 26 while if it rotates in the counterclockwise direction, the carriage 28 moves towards the second limit position 27. During the transportation cycle the deflector roller 45 is freely rotatable and the feed belt 17 is driven by means of the endless belt 16 bearing thereagainst. The supply of power to the conveyor motor 47 is switched off as soon as the carriage 28 reaches one of the limit positions 26, 27. The term idle travel is used to denote a travel movement of the carriage 28 during which no sheet 2 is deposited on the stack 12.

The conveyor system 4 (see FIG. 1) extends through the entry 11 and forks in a switching arrangement 48 into the two conveyor paths 40 and 41. The switching arrangement 48 includes the switching roller 39, two endless belts 49 and 49' which pass around rollers, and a mechanical deflector 50. The plane of the conveyor system 4 is aligned radially with the axis of the switching roller 39, while the belts 49, 49' which form a part of the conveyor system 4, extending symmetrically from that plane, bear snugly from both sides against the periphery of the switching roller 39 and lie against the feed belt 17 over the switching roller 39. With the feed belt 17, the belts 49 and 49' form the beginning of the respective conveyor paths 40, 43. A switching drive 51 which is connected to the control device 6 can determine the position of the deflector 50 and thus the path for the sheet 2 through the switching arrangement 48 or the feed system 7, the switching arrangement 48 advantageously being controlled in such a way as to avoid idle travel movements on the part of the carriage 28 and thus wasting time.

Shortly before arriving at one of the two limit positions 26, 27 the carriage 28 may switch over the deflector 50 in a purely mechanical fashion. That advantageously simplifies the control device 6. In its movement to the first limit position 26, the carriage 28 switches over the path through the switching arrangement 48 into the first conveyor path 40. When the carriage 28 reaches the second limit position 27, the deflector 50 guides the sheet 2 to the second conveyor path 43. Therefore the carriage 28 always waits at the end of the respective shorter conveyor path 40 or 43 until the sheet 2 is conveyed through the entry 11.

In the drawing, sections of the belts are interrupted for reasons concerned with illustration of the components, giving the impression of an asymmetrical arrangement. If the carriage 28 is disposed precisely between the two limit positions 26 and 27, the axis of the central guide roller 30 defines a plane which is normal to the stack plane 19, 19' and which includes the axis of the switching roller 39. The belts 16 through 18 and the stack 12 are preferably disposed symmetrically relative to that plane.

The belts 49, 49' and each of the belts 16 through 18 may be formed from a plurality of parallel conveyor belts. Preferably the endless belt 16 comprises strings of round cross-section, which bear securely against the belts 17 and 18 which are of rectangular cross-section. It is advantageously possible for the transportation belt 18 to be a single wide belt which is suited to the dimensions of the sheets 2, so that the stack 12 is better supported. For the sake of clarity of the drawing, the drawings do not show tensioning rollers or other tensioning devices which hold the conveyor belts taut.

Detectors 52, 53 and 54 such as light barrier arrangements which are connected to the control device 6 are arranged to detect the presence of the sheets 2. Arranged at the entry 11 above the conveyor device 4 is the first detector 52 which recognises the presence of the sheet 2 at the entry 11 and supplies the control device 6 with a starting signal for the feed system 7. The detectors 53 and 54 are installed at the two ends of the transportation path for the stack 12 and generate an end signal which terminates the transportation cycle in the control device 6. The end signal is supplied to the control device 6 either by the second detector 53 as soon as the stack 12 has passed into the box 9 or the third detector 54 if the stack 12 is transported into the return dish 10. A line 55, 55' of which part is shown connects the detector 54 to the control device 6.

Instead of the detectors 53 and 54, the control device 6 may simply switch on the drive means 24 and 46 by way of a time switch (not shown herein) and drive the transportation system 8 until a point on the transportation belt 18 has moved from the drive roller 20 to the roller 21. At the end of the predetermined period of time, the transportation system 8 is locked again and the end signal is triggered off.

In the acceptance cycle the intermediate storage apparatus waits until the sheet 2 triggers off the start signal in the first detector 52. During that time the carriage 28 has moved into one of the two limit positions 26, 27 and the switching arrangement 48 is pointing into the shorter conveyor path 40 or 43. In the drawing the carriage 28 is waiting in the first limit position 26.

The sheet 2 is pushed through the entry 11 into the switching arrangement 48 by the conveyor system 4 and, as that happens, it triggers off the start signal. The control device 6 locks the transportation system 8 and switches on the conveyor motor 47. The deflector roller 45 rotates in the counterclockwise direction and the carriage 28 moves away from the limit position 26. The deflector 50 and the belt 49 guide the sheet 2 into the conveyor path 40.

In the conveyor path 40, the sheet 2 is conveyed at double the speed of the carriage 28 and catches up with the carriage 28 as soon as the axis of the central guide roller 30 passes into the space above the stack 12. The sheet 2 follows the endless belt 16 which is tensioned over the first outer guide roller 29, and is rolled off through 180° into the stack plane 19, 19' by moans of a tongue portion of the deflector plate 28' so that the leading edge of the sheet 2 is deposited just flush on the predetermined location on the stack 12 or on the transportation belt 18 and the sheet 2 is rolled off advantageously without sliding on the stack 2 or the transportation belt 18, so that there are no shearing forces in the stack 12. The position of the front and rear faces of the sheet 2 are interchanged in the stacking operation. When the sheet 2 has been completely rolled off on the stack 12, after a brief travel the carriage 28 reaches the limit position 27 and switches off the conveyor motor 47.

The feed system 7 is now ready to accept a further sheet 2 by way of the conveyor path 43 and to roll it off on to the stack 12 around the second outer guide roller 31 while the carriage 28 travels into the first limit position 26.

The sheets 2 do not necessarily all have to be of the same size but may be in the form of banknotes from a predetermined set of nominal values. The sheets 2 are oriented in a predetermined fashion relative to the belts 16 through 18 by the conveyor system 4.

When the acceptance cycle is concluded and the carriage has moved into one of the limit positions 26, 27, the control device 6 decides whether the stack 12 has to be transported into the box 9 or into the return dish 10, and it switches on the roller motor 24 and the drive 46 in the corresponding direction of movement. They drive the drive roller 20 and the drive roller 34 in opposite directions, the endless belt 16 and the transportation belt 18 moving at the same speed so that the stack 12 does not fall apart. If for example the drive roller 20 rotates in the clockwise direction and the drive roller 34 rotates in the counterclockwise direction, the stack 12 then moves to the box 9.

As soon as the stack 12 has left the transportation belt 18, the frame 23 is pushed towards the stack plane 19, 19' and the one section of the transportation belt 18 again contacts the stacking sections of the endless belt 16. The intermediate storage apparatus returns again to the acceptance cycle.

The intermediate storage apparatus has the advantage that the sheets 2 are stacked to fore the stack 12 on the transportation belt 18 of the locked transportation system 8, the stack 12 is only moved for the purposes of transportation into the box 9 or into the return dish 10 and the sheets 2 are treated carefully, and the mass of the increasing stack 12 does not influence the acceptance cadence so that the sheets 2 can be fed to the intermediate storage apparatus, at a uniformly high speed.

If, as is usual in relation to banknotes, the sheets 2 have different features on their two sides, then the control device

6 can determine which side of the sheet 2 is towards the sensor 5, on the basis of the sensor signal. The control device 6 advantageously puts the deflector 50 into a position which is determined by the sensor signal, by means of the switching drive 51, so that the switching arrangement 48 passes the sheet 2 into the predetermined conveyor path 40 or 43 respectively so that the sheet 2 is deposited in a predetermined position on the stack 12. In the illustrated example the side of the sheet 2 which is towards the sensor 5 is deposited on the stack 12 directed towards the transportation belt 18 if the first conveyor path 40 has been used. If the sheet 2 passes through the second conveyor path 43, the side which is towards the sensor 5 faces on the stack 12 towards the stack plane 19, 19'.

Figure 3:
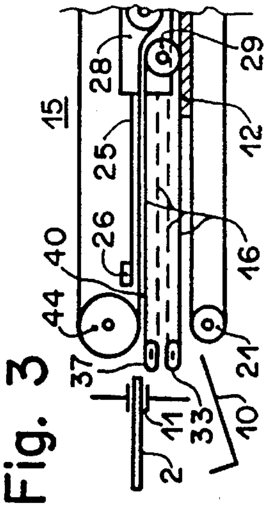
FIG. 3 shows an entry to a feed system.

An embodiment as shown in FIG. 3 has only a single conveyor path 40 which is used and which begins immediately downstream of the entry 11 and which is entirely extended for example as far as the first guide roller 29. The acceptance cadence of this construction is less than that of the apparatus shown in FIG. 2 as the sheets 2 can be rolled off on to the stack 12 only during the movement of the carriage 28 away from the first limit position 26. Each acceptance operation therefore involves an idle travel movement on the part of the carriage 28 as, before acceptance of the next sheet 2, the carriage 28 must return to the first limit position 26 before the intermediate storage apparatus is again ready to receive a further sheet 2. That intermediate storage apparatus has the advantage of being of a simple and inexpensive structure.

In FIG. 3 the carriage 28 is just in the middle on the rail 25 above the stack 12, the drawing illustrating only the half of the intermediate storage apparatus which is towards the entry 11. The endless belt 16 is passed in the stack plane 19, 19' (FIG. 2) around the roller 33, outside the sectional planes 15, to the drive roller 34 (FIG. 2). The part of the endless belt 16 which passes towards the entry 11 in the feed plane 32 (FIG. 2) passes around the first entry roller 37, goes outside the sectional planes 15 to the second entry roller 38 and comes back into the feed plane 32. The parts of the endless belt 16 shown in broken lines pass outside the sectional planes 15 for example between the stack plane 19, 19' and the feed plane 32. The feed belt 17 is tensioned by the deflector roller 44, the deflector roller 45 (FIG. 2) and the central guide roller 30 (FIG. 2).

The axes of the first entry roller 37 and the deflector roller 44 form, normal to the stack plane 19,19', an entry plane which defines the conveyor path 40. The axis of the roller 33 is arranged for example in the above-mentioned entry plane between the stack plane 19, 19' and the feed plane 32 while the spacing of the roller 21 relative to that plane is determined by the position of the return dish 10.

Further ideas relating to the configuration of the intermediate money storage assembly may be found in U.S. patent application No. 5,139,149 which is expressly incorporated herein.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. An intermediate sheet storage apparatus, comprising:

a first conveyor belt;

a second conveyor belt;

an inlet station;

first mounting means for mounting said first and second conveyor belts so as to define therebetween a first feed path from said inlet station;

a third conveyor belt;

first and second outlet stations;

second mounting means for mounting said second and third conveyor belts so as to define therebetween a transportation path between said first and second outlet stations;

drive means for driving said conveyor belts; and control means for controlling said drive means selectably (a) in an acceptance mode in which said third belt is stationary and in which said first and second conveyor belts are moved together by their drive means along said feed path so as to feed sheets nipped therebetween from said inlet station along said feed path to form a stationary stack on said third belt, said sheets being held between said second conveyor belt and the remainder of the stack while being conveyed onto the stack, and (b) in a transportation mode in which said second and third conveyor belts are moved together along said transportation path so as to transport said stack nipped between said second and third conveyor belts in one direction to said first outlet station and in a reversed direction to said second outlet station.

2. An apparatus according to claim 1, further comprising a rail mounted above said stack, a carriage mounted for movement along said rail, and a plurality of guide rollers mounted on said carriage, said first and second belts engaging said guide rollers so that the first and second belts change in geometry as said carriage moves along said rail, and said carriage being moved along said rail in said acceptance mode so that a sheet fed along said feed path is rolled around one of said guide rollers onto said stack.

3. Apparatus according to claim 2, wherein said carriage is moved along said rail in one direction during acceptance of each sheet and said carriage is moved along said rail in the opposite direction between the acceptance of consecutive sheets.

4. The apparatus of claim 1 wherein said sheet is rolled onto the stack.

5. The apparatus of claim 4 further comprising a roller engaged by said first belt, for rolling a sheet onto the stack.

6. Apparatus according to claim 1, wherein said first mounting means also mounts said first and second belts so as to define a second feed path from said inlet station to said stack, the apparatus further comprising switching means to guide a sheet at said inlet station selectably into said first-mentioned feed path and said second feed path.

7. Apparatus according to claim 6, wherein said control means is operable, when a plurality of sheets are accepted in said acceptance mode, to control said switching means such that consecutive accepted sheets are fed into alternative ones of said feed paths.

8. Apparatus according to claim 6, further comprising means for recognising features of sheets at said inlet station and producing a recognition signal in response thereto, said control means being operable to control said switching means in response to said recognition signal.

9. Apparatus according to claim 1, wherein said second mounting means comprises a support frame, a plurality of support rollers mounted on said support frame and around which said third belt extends, and means for urging said support frame towards said second belt and permitting said support frame to move away from said second belt as said stack increases in height.

10. Apparatus according to claim 1, wherein said third belt is in the form of a single wide belt.

11. Apparatus according to claim 1, wherein said second mounting means includes a plurality of support rollers mounted beneath said third belt adjacent said stack to support the stack through said third belt.

12. Apparatus according to claim 1, further comprising detector means for detecting presence of a sheet at said inlet station and producing a start signal in response thereto, said control means being responsive to said start signal to commence said acceptance mode.

13. An intermediate sheet storage apparatus, comprising:

a first conveyor belt;

a second endless conveyor belt;

an inlet station;

first mounting means for mounting said first and second conveyor belts so as to define therebetween a first feed path from said inlet station;

a third endless conveyor belt upon which a stack of sheets can be formed;

a rail mounted above said stack;

a carriage mounted for movement along said rail;

a plurality of guide rollers mounted on said carriage, said first and second belts engaging said guide rollers so that the first and second belts change in geometry as said carriage moves along said rail;

first and second outlet stations;

second mounting means for mounting said second and third conveyor belts so as to define therebetween a transportation path between said first and second outlet stations;

drive means for driving said conveyor belts; and control means for controlling said drive means selectably (a) in an acceptance mode in which said third belt is stationary and in which said first and second conveyor belts are moved together by their drive means along said feed path and said carriage is moved along said rail such that a sheet nipped between said first and second feed conveyor belts, from said inlet station is conveyed to said carriage and is rolled around one of the guide rollers to form a stationary stack on said third belt, and (b) in a transportation mode in which said second and third conveyor belts are moved together along said transportation path so as to transport said stack nipped between said second and third conveyor belts in one direction to said first outlet station and in a reversed direction to said second outlet station.

14. Apparatus according to claim 13, wherein said first mounting means also mounts said first and second belts so as to define a second feed path from said inlet station to said stack, the apparatus further comprising switching means to guide a sheet at said inlet station selectably into said first-mentioned feed path and said second feed path.

15. Apparatus according to claim 14, wherein said control means is operable, when a plurality of sheets are accepted in said acceptance mode, to control said switching means such that consecutive accepted sheets are fed into alternative ones of said feed paths.

16. Apparatus according to claim 14, further comprising means for recognizing features of sheets at said inlet station and producing a recognition signal in response thereto, said control means being operable to control said switching means in response to said recognition signal.

17. An intermediate sheet storage apparatus, comprising:

a first conveyor belt;

a second endless conveyor belt;

an inlet station;

first mounting means for mounting said first and second conveyor belts so as to define therebetween a first and second feed path from said inlet station;

a third endless conveyor belt;

first and second outlet stations;

second mounting means for mounting said second and third conveyor belts so as to define therebetween a transportation path between said first and second outlet stations;

drive means for driving said conveyor belts; and control means for controlling said drive means selectably (a) in an acceptance mode in which said third belt is stationary and in which said first and second conveyor belts are moved together by their drive means along said feed paths so as to feed sheets nipped therebetween from said inlet station along said feed path to form a stationary stack on said third belt, said sheets being held tightly between said conveyor belt and the remainder of the stack while being conveyed onto the stack, and (b) in a transportation mode in which said second and third conveyor belts are moved together along said transportation path so as to transport said stack nipped between said second and third conveyor belts in one direction to said first outlet station and in a reversed direction to said second outlet station.

18. An intermediate storage sheet apparatus comprising:

first and second outlet stations;

a transporter upon which a stationary stack of one or more sheets can be formed during an acceptance cycle, the transporter being associated with the first or second outlet station and wherein the transporter is stationary during the acceptance cycle; and a first roller and a conveyor wherein sheets are conveyed to the first roller by the conveyor, and are rolled onto the transporter during the acceptance cycle while under the control of the first roller, and wherein the transporter moves the stack during a transport cycle to the first or second outlet station.

19. Apparatus according to claim 18 further comprising means for moving the first roller across the stack while the sheet is being rolled onto the stack.

20. Apparatus according to claim 19 further comprising a deflector for directing the sheet around the first roller and onto the stack.

21. Apparatus according to claim 20 further comprising a bearing means for bearing the sheet against the remainder of the stack when the stack is being transported.

22. Apparatus according to claim 21 further comprising a third roller between the first and second roller, wherein the third roller is also part of the bearing means.

23. Apparatus according to claim 22 wherein the third roller deflects the sheet onto the stack.

24. Apparatus according to claim 19 wherein the means for moving the first roller comprises a rail mounted above the stack and a carriage mounted on the rail, wherein the first roller is mounted on the carriage.

25. Apparatus according to claim 18 wherein the conveyor comprises first and second paths to the roller.

26. Apparatus according to claim 25 further comprising a switch to guide a sheet selectably into either of the first and second paths.

27. Apparatus according to claim 26 comprising a second roller for rolling the sheet onto the stack, wherein the first roller is associated with the first feed path and the second roller is associated with the second feed path.

28. Apparatus according to claim 18 wherein the sheet approaches the first roller in a feed plane, the stack has a top which is in a stack plane and the first roller rolls the sheet from the feed plane to the stack plane.

29. The apparatus of claim 28 wherein the roller rotates the sheet as the sheet is rolled from the feed plane to the stack plane.

30. Apparatus according to claim 29 wherein the feed plane is essentially parallel to the stack plane.

31. Apparatus according to claim 18 wherein the sheet is rotated at least 90° as it is rolled onto the stack.

32. Apparatus according to claim 18 wherein the sheet is rotated approximately 180° as it is rolled onto the stack.

33. Apparatus according to claim 18 wherein individual sheets are conveyed to the roller and rolled onto the stack.

34. Apparatus according to claim 18 wherein the transporter has an essentially horizontal surface and the stack is formed on the essentially horizontal surface of the transporter.

35. The apparatus of claim 18, wherein a first sheet is rolled onto the transporter.

36. The apparatus of claim 35, wherein a subsequent sheet is rolled onto a previously deposited sheet.

37. The apparatus of claim 36, further comprising a controller controlling the transporter, for determining when the stack is to be transported and which outlet station the stack is transported to.

38. The apparatus of claim 18, further comprising a sensor to detect the presence of a sheet, wherein the conveyor conveys the detected sheet from the sensor means to the first roller.

39. The apparatus of claim 38, wherein the sensor senses characteristics of the sheet.

40. An intermediate storage apparatus comprising:

at least two outlet stations;

means for rolling a sheet onto a transporter to form a stationary stack of one or more sheets, the sheet being under the control of the rolling means while being rolled onto the stack;

means for conveying a sheet to the means for rolling wherein the sheet is gripped between an endless belt and a feed belt; and means for selectively transporting the stack to one of the at least two outlet stations, wherein the stack is gripped between the endless belt and a transport belt.

41. The apparatus of claim 40, further comprising a sensor means, wherein the conveyor means conveys the sheet from the sensor means to the rolling means.

42. The apparatus of claim 41, wherein the sensor means senses characteristics of the sheet.

43. A method of handling sheets comprising:

conveying a sheet gripped between an endless belt and a feed belt during an acceptance cycle to a first roller;

rolling the sheet onto a transporter which is stationary during the acceptance cycle to form a stationary stack of one or more sheets;

determining which one of at least two destinations to transport the stack;

entering a transport cycle; and transporting the stack during the transport cycle to one of the destinations, wherein the stack is clamped between the endless belt and a transport belt.

44. The method of claim 43, further comprising sensing the sheet prior to conveying the sheet.

45. The method of claim 44, wherein the sensing step comprises sensing characteristics of the sheet.

46. The method of claim 43 further comprising conveying a subsequent sheet to the first roller and rolling the sheet onto a previously deposited sheet of the stationary stack.

47. The method of claim 43, wherein the sheet is a bill, the method further comprising determining the acceptability of the bill prior to rolling the bill onto the stack.

48. An intermediate storage apparatus comprising:

first and second outlet stations;

transporter means upon which a stationary stack of one or more sheets can be formed during an acceptance cycle, the transporter means operable to transport the stack to either the first or second outlet stations during a transport cycle, wherein the stack is gripped between an endless belt and a transport belt;

rolling means for rolling a sheet onto the transporter means to form a stack of one or more sheets, wherein a first sheet is rolled onto the transporter means; and conveying means for conveying a sheet to the rolling means wherein the sheet is gripped between the endless belt and a feed belt.

49. The apparatus of claim 48, further comprising a sensor means, wherein the conveyor means conveys the sheet from the sensor means to the rolling means.

50. The apparatus of claim 49, wherein the sensor means senses characteristics of the sheet.

51. The apparatus of claim 48 wherein the rolling means rolls sheets subsequently conveyed by the conveying means, onto the previously deposited sheet.

* * * * *

UNITED STATES PATENT AND TRADEMARK OFFICE

CERTIFICATE OF CORRECTION

PATENT NO. : 5,569,015

DATED : October 29, 1996

INVENTOR(S) : Andre Gerlier

It is certified that error appears in the above-identified patent and that said Letters Patent is hereby corrected as shown below:

Col. 7, line 57, cancel "fore" and substitute --form--.

Col. 8, line 54, delete "application".

Signed and Sealed this

Twenty-fourth Day of June, 1997

Attest:

BRUCE LEHMAN

*Attesting Officer* *Commissioner of Patents and Trademarks*